United States Patent
Su

(10) Patent No.: US 8,724,043 B2
(45) Date of Patent: May 13, 2014

(54) LOCKING STRUCTURE FOR FLAT PANEL DISPLAY DEVICE FIXING APPARATUS

(76) Inventor: Yuanzhi Su, Jiangmen (CN)

( * ) Notice: Subject to any disclaimer, the term of this patent is extended or adjusted under 35 U.S.C. 154(b) by 125 days.

(21) Appl. No.: 13/355,147

(22) Filed: Jan. 20, 2012

(65) Prior Publication Data

US 2012/0275855 A1    Nov. 1, 2012

(30) Foreign Application Priority Data

Apr. 28, 2011   (CN) .................. 2011 2 0130239 U

(51) Int. Cl.
*G02F 1/1333* (2006.01)

(52) U.S. Cl.
USPC ......................... 349/58; 403/374.1; 248/924

(58) Field of Classification Search
USPC ........... 361/679.01, 679.21, 679.58; 248/917, 248/924; 349/58; 403/326, 373, 374.1
See application file for complete search history.

(56) References Cited

U.S. PATENT DOCUMENTS

| | | | | |
|---|---|---|---|---|
| 7,646,591 B2 * | 1/2010 | Oomoto et al. | .......... | 361/679.01 |
| 7,828,259 B2 * | 11/2010 | Wang et al. | ................ | 248/316.4 |
| 7,986,512 B2 * | 7/2011 | Tang | ........................ | 361/679.01 |
| 8,094,439 B2 * | 1/2012 | Lin | ........................ | 361/679.01 |
| 8,169,562 B2 * | 5/2012 | Jing | ................................ | 349/58 |
| 8,418,985 B2 * | 4/2013 | Wang et al. | ................... | 248/917 |
| 2006/0231667 A1 * | 10/2006 | Tsuo | ............................ | 248/917 |

FOREIGN PATENT DOCUMENTS

CN    202048315 U    11/2011

* cited by examiner

*Primary Examiner* — Michael P Ferguson

(57) ABSTRACT

A locking structure for flat panel display device fixing apparatus includes a main frame. The main frame has an open cavity, a first and a second stopping rib that are formed above the two opposite sides thereof respectively and that extend inwards. The first stopping rib is longer than the second stopping rib. Below the first stopping rib, the main frame further includes an opening in which a pressure apparatus is mounted for locking a flat panel display device. The pressure apparatus includes a first and a second pressure block which are movable relatively. The first pressure block includes moveable rollers respectively mounted on both sides thereof. The second pressure block includes pushers for pushing the rollers outwards. The opening includes inclined planes on both sides thereof corresponding to the rollers.

4 Claims, 1 Drawing Sheet

LOCKING STRUCTURE FOR FLAT PANEL DISPLAY DEVICE FIXING APPARATUS

CROSS-REFERENCE TO RELATED APPLICATIONS

This application claims priority to Chinese Patent No. 201120130239.2, filed on Apr. 28, 2011 under the title "A LOCKING STRUCTURE FOR FLAT PANEL DISPLAY DEVICE FIXING APPARATUS", the contents of which are incorporated by reference herein.

FIELD

The present invention relates to a locking structure for flat panel display fixing apparatus.

BACKGROUND

Presently, flat panel display devices are widely used because of numerous advantages, such as ingenious appearance, light weight, slim shape, powerful functions, lower power consumption and etc. For portability, flat panel display devices are usually designed to be super slim and compact and generally do not include a rigid mechanical fixing interface.

However, these designs may cause hand fatigue when held for a long period. Furthermore, under some circumstances, users may not be able to hold a portable flat panel display device by hand, and users may need an extra apparatus for fixing it in place. For example, flat panel display devices may be fixed on a dashboard of a car for use as a GPS or car-carrying computer, or behind a front seat of the car for use as a video player, or on a portable speaker, or on a wall for use as a main controller for a smart home, etc.

All uses listed above require a simple, stable and aesthetic fixing apparatus to attach the flat panel display device to a surface safely, steadily and reliably. Safely, steadily and reliably attaching the flat panel display device may be particularly important, for example, in cars where rapid acceleration (e.g., during taking off or braking) may be experienced.

Presently, there are some fixing apparatuses dedicated for flat panel display devices. Such a fixing apparatus usually consists of a frame formed by four elongated bars. Users have to assemble the frame bars to enclose the panel display equipment and it is rather complicated, inconvenient, unstable, and unsafe in use.

In an earlier Chinese patent application of the Applicant titled, "A Fixing Apparatus for Flat Panel Display Device", Chinese Pat. App. No. 201010542080.5, the problem described above is solved through a fixing apparatus for flat panel display device. The fixing apparatus disclosed comprises a main frame, which has an open cavity, and a first and a second stopping rib formed above the two opposite sides of the cavity. The extending length of the first stopping rib is greater than that of the second stopping rib. A retractable stopping block is mounted below the first stopping rib. However, because the retractable stopping block is used to lock and fix the flat panel display device in place, the structure may not be robust enough, and operation is inconvenient to a certain extent.

SUMMARY

The technical solution provided in the present invention is a locking structure for flat-panel display device fixing apparatus with a rigid structure and easy operation.

In order to solve the aforementioned technical problem, the locking structure for flat-panel display device fixing apparatus according to the present invention comprises a main frame having an open cavity, a first and a second stopping rib formed respectively above the two opposite sides of the cavity and extending inwards, the extending length of the first positioning stopping rib being greater than the extending length of the second stopping rib, below the first stopping rib the main frame is further provided with an opening, in which a pressure apparatus is mounted for locking a flat panel display device, the pressure apparatus comprises a first and a second pressure block which are movable relatively, the first pressure block is provided with moveable rollers respectively mounted on the two opposite sides thereof, the second pressure block is provided with pushers for pushing the rollers to move outwards, the opening is provided with inclined planes on two opposite thereof corresponding to the rollers.

As a further improvement of the abovementioned technical solution, the first pressure block is sleeved with the second pressure block, the second pressure block is provided with elongated grooves respectively on two opposite thereof, the first pressure block is provided with positioning pins on two opposite thereof, which are penetrated into the elongated grooves.

As a further improvement of the abovementioned technical solution, the first pressure block is provided with horizontal grooves on two opposite thereof respectively, in which the rollers are mounted respectively, the first pressure block is further provided with vertical grooves connected with the horizontal grooves respectively, the pushers are respectively corresponding to the vertical grooves.

As a further improvement of the abovementioned technical solution, the first pressure block is provided with positioning plates extending outwards on two opposite thereof respectively; the first, second pressure block are provided with U-shaped reentrant cavities corresponding with each other respectively.

The beneficial effects of the present invention could include: the mechanism of the locking structure disclosed herein to lock a flat-panel display device could be described as: under an external force, pushed by the pushers of the second pressure block push, the rollers of the first pressure block move outwards to contact the inclined plane, meanwhile the first pressure block moves inwards to achieve the fixation of the flat-panel display device by pressure, the structure is robust, the operation is convenient.

BRIEF DESCRIPTION OF THE DRAWINGS

Further details and advantages of the present invention are explained using embodiments, with reference to the attached drawings. In the drawings.

DETAILED DESCRIPTION

Figure 1:
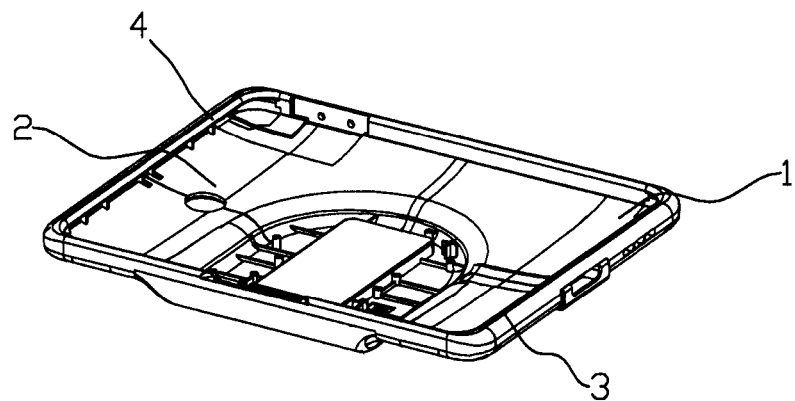
FIG. 1 is a schematic view of the present invention.
Figure 2:
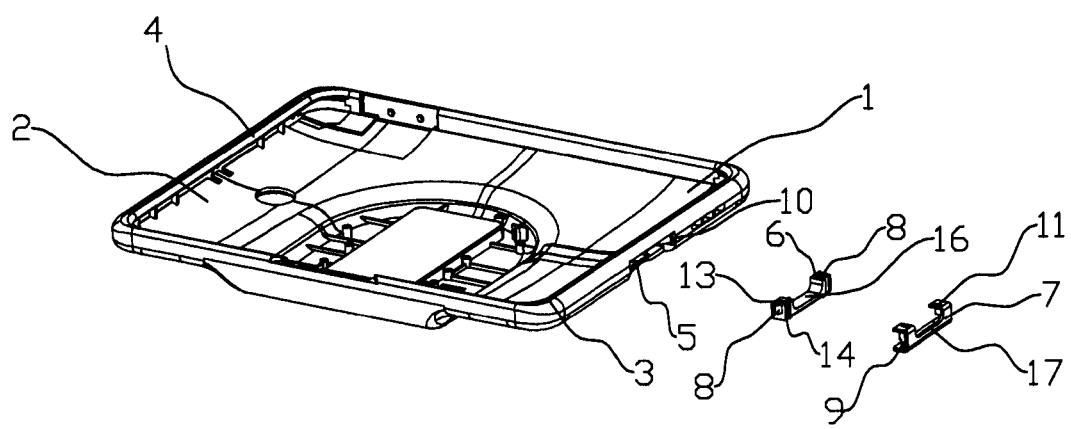
FIG. 2 is an exploded view of the present invention.
Figure 3:
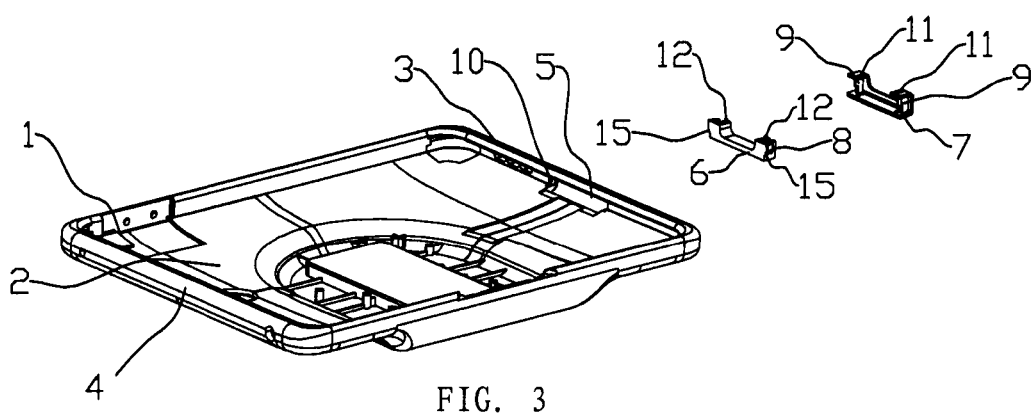
FIG. 3 is another exploded view of the present invention.

As shown in FIGS. 1-3, a locking structure for a flat-panel display device fixing apparatus according to the preset invention comprises a main frame 1. The main frame 1 is provided with an open cavity 2, a first and a second stopping rib 3 and 4 respectively formed above the two opposite sides of cavity 2, and an opening 5 below the first stopping rib 3. The first, second stopping rib 3, 4 are formed above the cavity 2 and extend inwards respectively. The extending length of the first stopping rib 3 is greater than that of the second stopping rib 4.

The locking structure further comprises a pressure apparatus device mounted in the opening 5 for locking a flat-panel display. The pressure apparatus includes a first and a second pressure block 6, 7, wherein the first pressure block 6 is provided with two rotatable rollers 8 on the two opposite sides thereof, respectively. Correspondingly, the second pressure block 7 is provided with two pushers 9 on the two opposite sides thereof, respectively, for pushing the rollers 8 to move outwards. The opening 5 is provided with incline planes 10 on the two opposite sides thereof corresponding to the rollers 8.

In use, pushed by the pushers 9 of the second pressure block 7, the rollers 8 of the first pressure block 6 move outwards to contact the inclined planes 10. Meanwhile, the first pressure block 6 moves inwards to achieve the fixation of the flat panel display device by pressure. Thus, the structure is robust and reliable, the operation is convenient.

In this embodiment, the first pressure block 6 is sleeved with the second pressure block 7. The second pressure block 7 is provided with two elongated grooves 11 on the two opposite sides thereof. Correspondingly, the first pressure block 6 is provided with two positioning pins 12 on the two opposite sides thereof, respectively. The positioning pins 12 penetrate the elongated grooves 11 respectively to allow the first, second pressure block 6, 7 to slip relatively while not to depart from each other.

On each side of the first pressure block 6, a horizontal groove 13 and a vertical groove 14 connected with the horizontal groove 13 are provided. The rollers 8 are respectively disposed in the horizontal grooves 13, and the pushers 9 correspond to the vertical grooves 14. The first pressure block 6 is further provided with two positioning plates 15 extending outwards on the two opposite sides thereof. The pressure apparatus is firmly fixed into the opening 5 via the positioning plates 15 clamping the two sides of the opening 5, thereby preventing the pressure apparatus from departing from the main frame 1.

The first, second pressure block 6, 7 are respectively provided with a first and a second U-shaped reentrant cavity 16, 17, corresponding with each other. The first, second U-shaped reentrant cavities 16, 17 allow a cable to connect the flat panel display device fixed in the main frame 1 to an external power source.

While the invention has been described in terms of what are presently considered to be the most practical and preferred embodiments, it is to be understood that the invention need not be limited to the disclosed embodiments. On the contrary, it is intended to cover various modifications and similar arrangements included within the spirit and scope of the appended claims which are to be accorded with the broadest interpretation so as to encompass all such modifications and similar structure.

What is claimed is:

1. A locking structure for a flat panel display device fixing apparatus, comprising:
   a main frame comprising:
   sidewalls enclosing an open cavity;
   first and second stopping ribs formed on opposing sidewalls that are formed above two opposite sides of the open cavity, respectively, and that extend inwards toward each other,
   wherein the length of the first stopping rib is greater than the length of the second stopping rib; and
   an opening that is formed below the first stopping rib within a respective sidewall and that includes inclined planes on two opposite sides of the opening, respectively; and
   a pressure apparatus:
   that is mounted within the opening for locking a flat panel display device within the open cavity; and
   that comprises first and second pressure blocks which are movable,
   wherein the first pressure block is sleeved with the second pressure block,
   wherein the first pressure block includes moveable rollers mounted on two opposite sides of the first pressure block, respectively, and
   the first pressure block further includes horizontal grooves that are formed on the two opposite sides of the first pressure block, respectively, and vertical grooves that are radially inward of and connected with the horizontal grooves, respectively,
   wherein the rollers are mounted within the horizontal grooves, respectively, and
   wherein the second pressure block includes pushers protruding from opposing sides of the second pressure block and corresponding to the vertical grooves, respectively, for contacting the rollers when inserted into the vertical grooves and pushing the rollers radially outward into contact with the inclined planes.

2. The locking structure according to claim 1 wherein:
   the second pressure block further includes elongated grooves formed in the two opposite sides of the second pressure block, respectively; and
   the first pressure block further includes positioning pins:
   that are formed on the two opposite sides of the first pressure block, respectively;
   that correspond to the elongated grooves; and
   that penetrate the elongated grooves.

3. The locking structure according to claim 1, wherein the first pressure block further includes positioning plates that extend outward and that are formed on the two opposite sides of the first pressure block, respectively.

4. The locking structure according to claim 1, wherein:
   the first pressure block further includes a first U-shaped cavity; and
   the second pressure block further includes a second U-shaped cavity.

* * * * *